United States Patent [19]

King

[11] Patent Number: 4,624,732

[45] Date of Patent: Nov. 25, 1986

[54] TIRE ENVELOPE SEALING APPARATUS FOR RECAPPING TIRES

[75] Inventor: Michael J. King, Concord, Calif.

[73] Assignee: 501 Oliver Rubber Company, Oakland, Calif.

[21] Appl. No.: 715,631

[22] Filed: Mar. 25, 1985

[51] Int. Cl.⁴ .................. B29C 35/02; B29D 30/56
[52] U.S. Cl. .................... 156/394.1; 156/96; 156/909; 425/17; 425/21
[58] Field of Search ............. 156/95, 96, 97, 128.1, 156/130.5, 909, 394.1; 425/17, 21, 22, 58

[56] References Cited

U.S. PATENT DOCUMENTS

| | | | |
|---|---|---|---|
| 3,884,740 | 5/1975 | Schelkmann | 156/96 |
| 4,153,497 | 5/1979 | Budrioli | 156/909 |
| 4,274,897 | 6/1981 | Barefoot | 156/96 |
| 4,299,647 | 11/1981 | DeHaven | 156/96 |
| 4,309,234 | 1/1982 | Witherspoon | 156/96 |

Primary Examiner—Lois E. Boland
Attorney, Agent, or Firm—Owen, Wickersham & Erickson

[57] ABSTRACT

A device for use in vulcanizing a premolded, precured tire tread to a tire casing in a tire retreading operation, for sealing a retreading envelope against the tire carcass in the bead area of the tire. The device comprises a pair of rigid circular ring members each sized to fit against the exterior bead portion of the tire casing, with the envelope interposed between the ring and the tire casing. A series of interconnecting springs are attached to the rings at circumferentially spaced apart locations to hold them against the tire in the bead area, and spacers attached to at least some of said springs maintain a uniform distance between the bead portions of the tire casing. A compression member on an edge of each ring member provides increased sealing pressure against the envelope on the tire.

4 Claims, 7 Drawing Figures

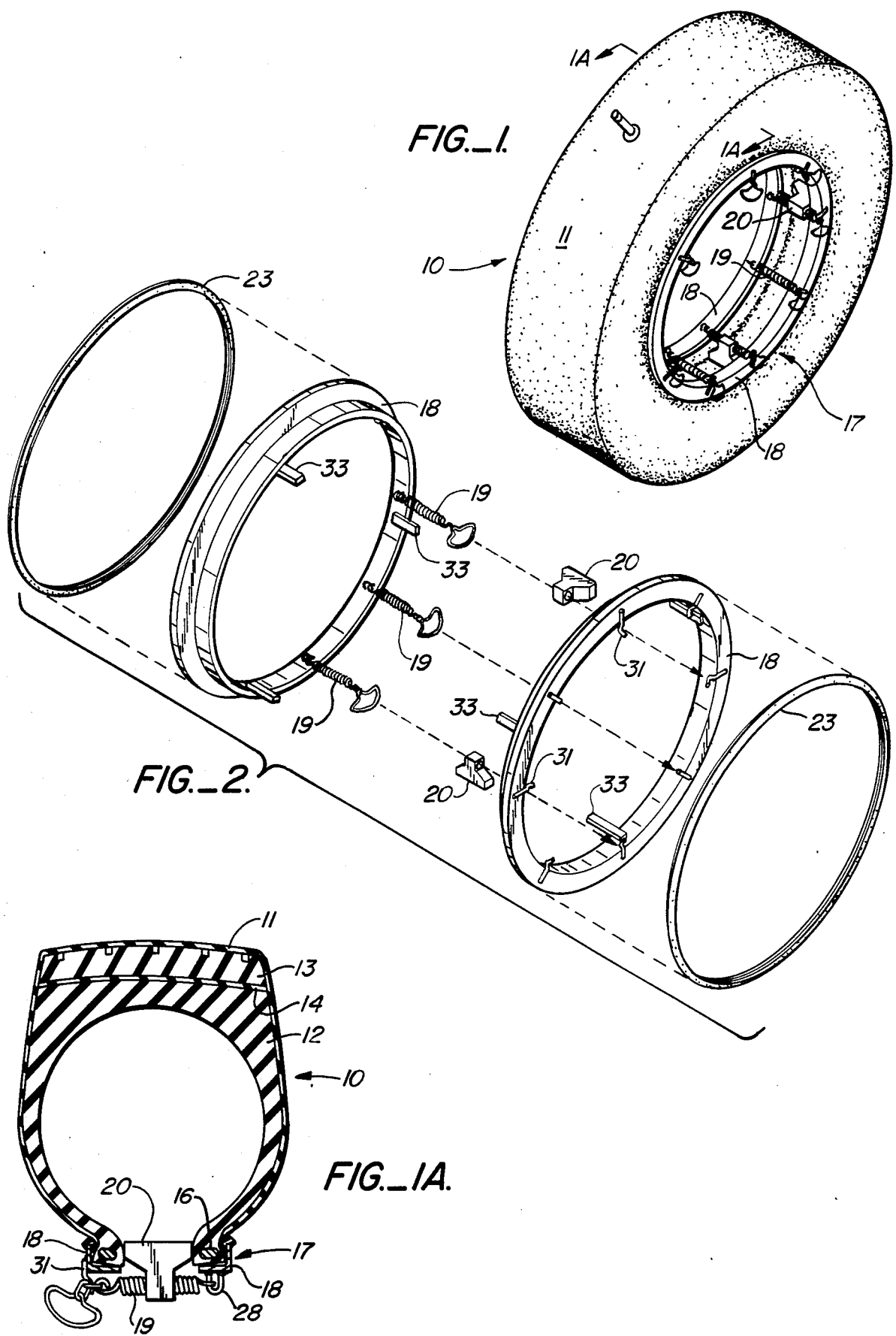

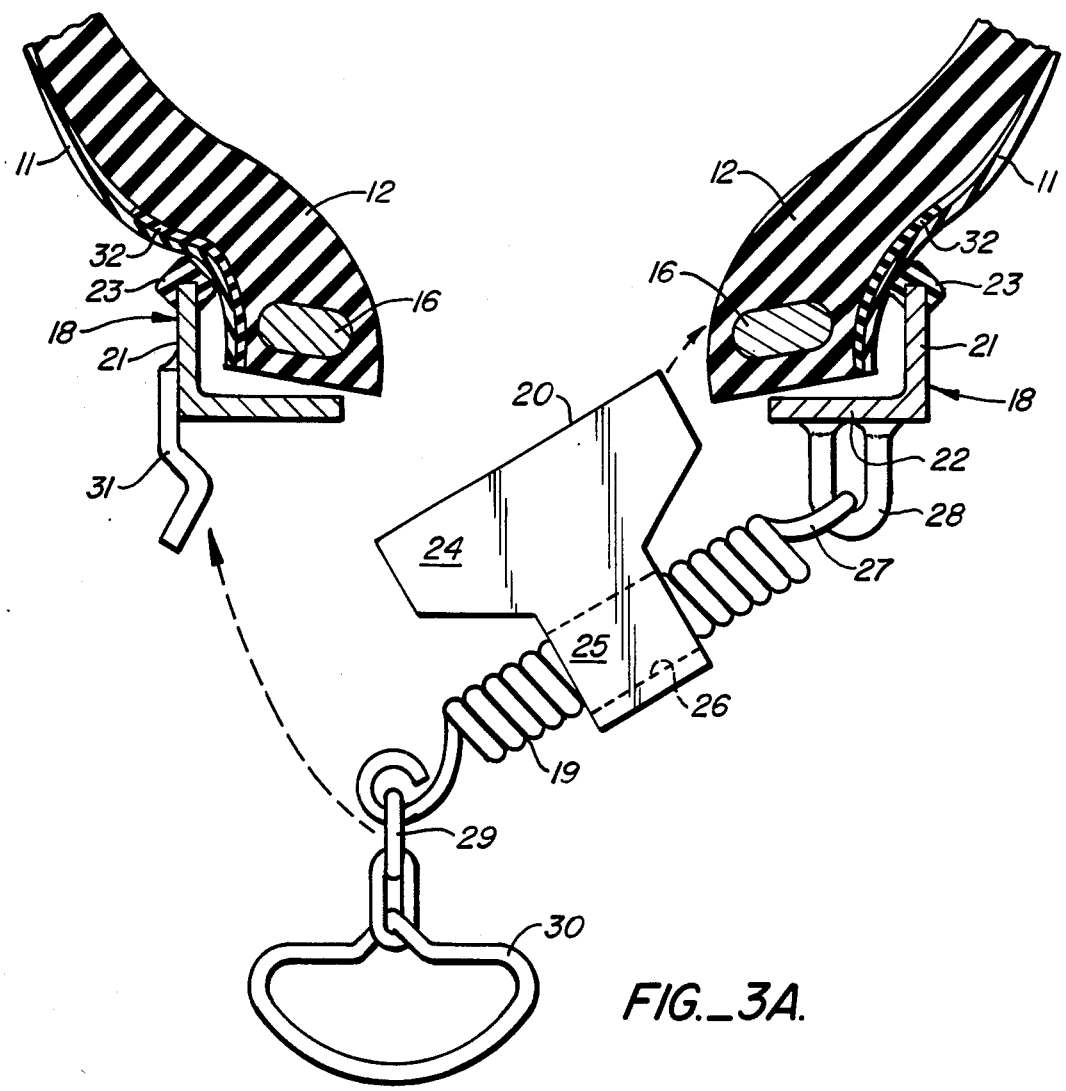
FIG._3A.
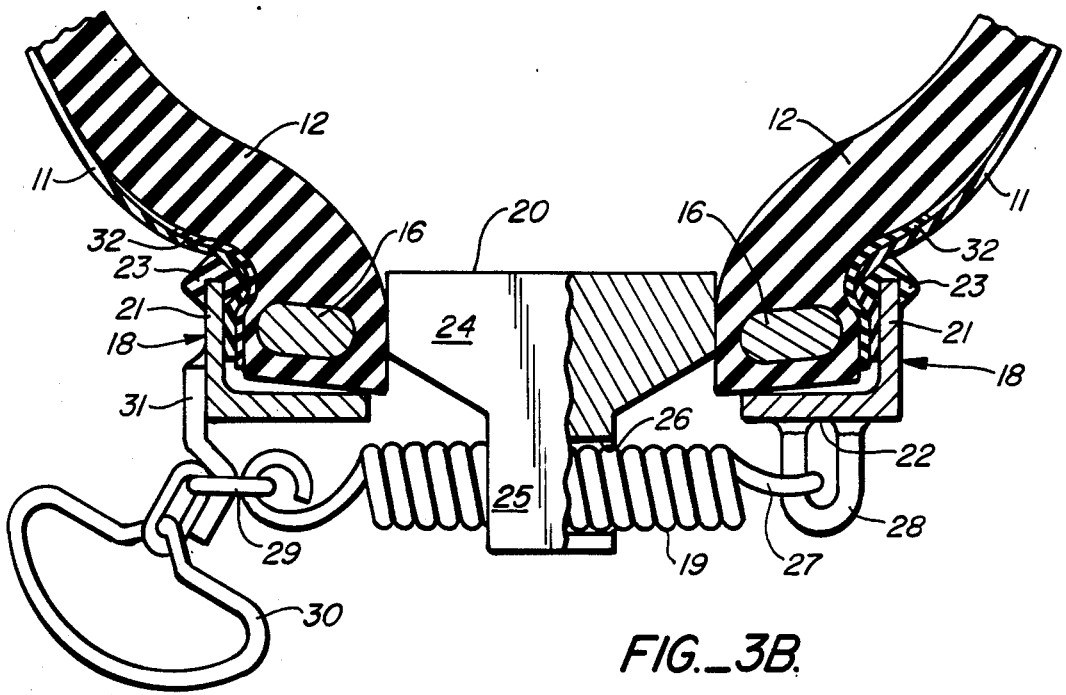
FIG._3B.

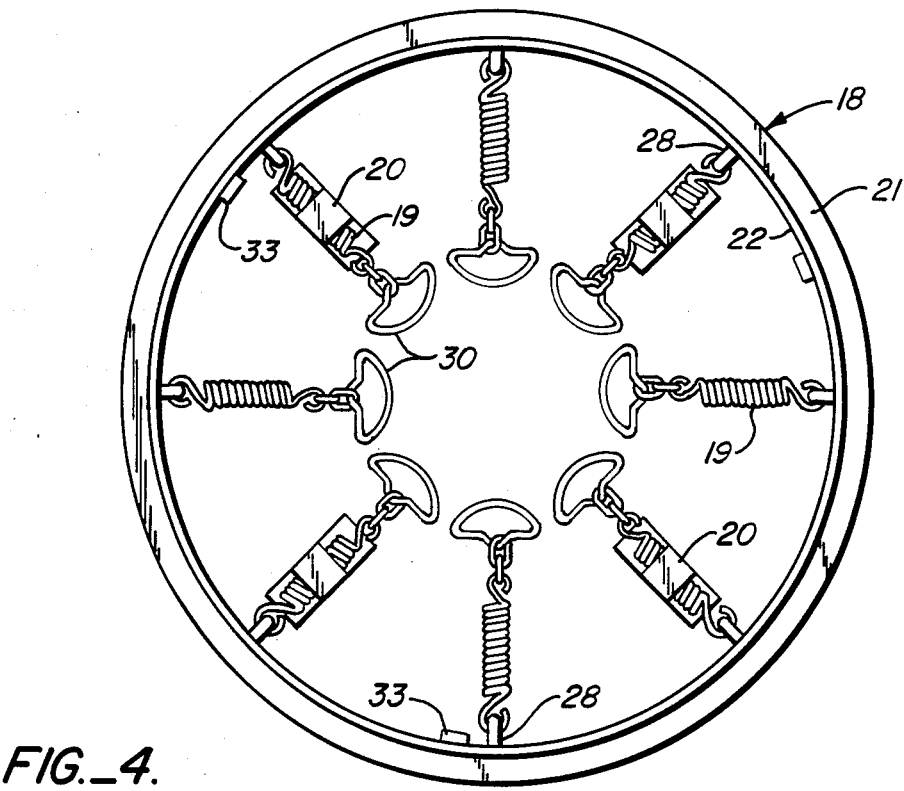
FIG._4.
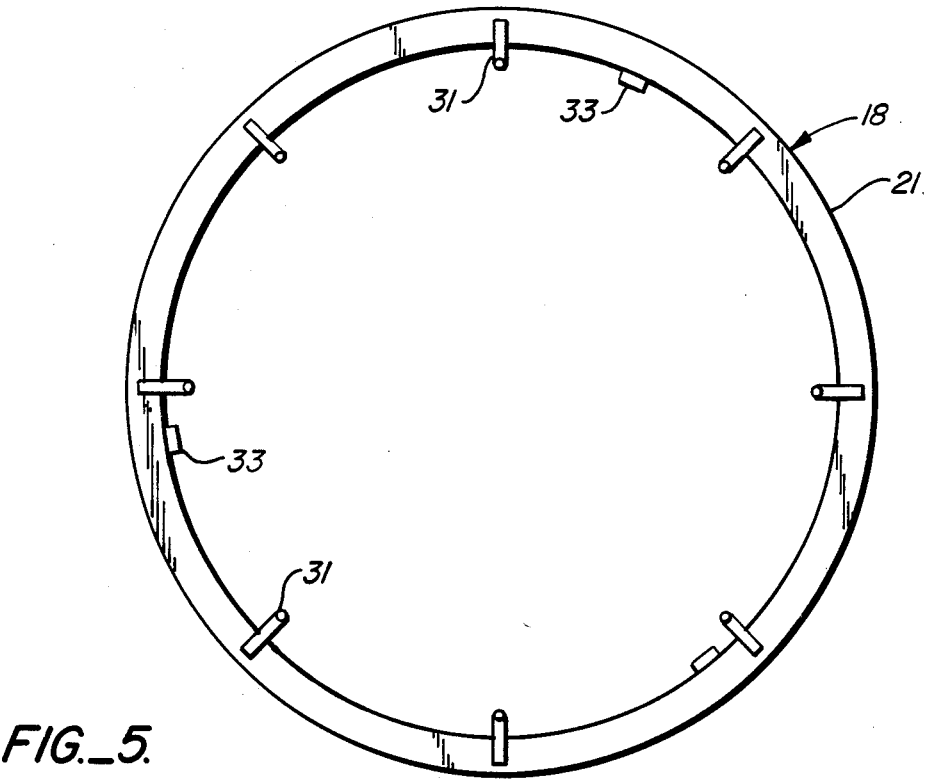
FIG._5.

TIRE ENVELOPE SEALING APPARATUS FOR RECAPPING TIRES

BACKGROUND OF THE INVENTION

The invention relates to pneumatic tire retreading, and more particularly to a device for sealing a tire retreading envelope against a tire carcass to prevent air leakage when the envelope is evacuated and the tread is vulcanized onto the carcass.

In tire retreading utilizing premolded, precured tire tread, the buffed tire carcass, a layer of uncured rubber compound, and the premolded tread rubber are assembled and placed into a flexible rubber envelope which encases all or a substantial portion of the carcass and the precured tread. The interior of the envelope is then substantially evacuated, and its exterior is subjected to positive pressure to hold the tire tread firmly in place while it is bonded to the tire carcass. Such a procedure and apparatus are shown, for example, in U.S. Pat. No. 3,779,830, which also discloses inflation of the tire carcass during tread replacement.

The flexible envelope must be placed about the tire in sealed relationship, which has been cumbersome, time-consuming and undependable, according to prior art procedures and apparatus. The encased tire with the preformed tread is placed in a heated chamber or autoclave for vulcanization of the tread to the tire carcass. A type of apparatus for recapping a tire and sealing the envelope closed is shown in U.S. Pat. No. 3,886,028.

One approach to the problem of sealing a tire envelope to a tire to be retreaded is shown in U.S. Pat. No. 4,274,897. Another apparatus of that provides an improved tire envelope sealing system which is superior to that disclosed in the latter patent is described in my co-pending application Ser. No. 579,437, filed Feb. 13, 1984. Although the devices shown in the aforesaid disclosures are all effective to a degree in sealing a tire envelope for a tire being retreaded, they may become inefficient where a tire with a worn or damaged bead area is encountered. In such a situation, it may be difficult to properly seal the envelope in the bead area, thereby jeopardizing the entire recapping procedure.

It is therefore one object of the present invention to solve the aforesaid problem by providing an improved apparatus for sealing a retreading envelope about a tire for recapping that applies concentrated sealing pressure in the bead.

Another object of the invention is to provide apparatus for sealing an envelope on a tire for recapping that is simple and easy to install without the need for special tools and yet highly effective so that air and other gases are more dependably prevented from entering the envelope during curing.

SUMMARY OF THE INVENTION

According to the present invention, an apparatus for sealing a retreading envelope against the tire carcass, for the purpose of vulcanizing a premolded, precured tire tread to a tire carcass in the retreading operation, comprises a pair of rigid circular rings each sized to fit against the exterior and around the inner edge of the tire carcass bead, with the envelope interposed between the ring and each ring has generally a right angular cross section comprised of an outer annular portion that bears against the outer surface of the tire in the bead area and a cylindrical inner portion that bears against the inner edge of the tire bead. Retaining means are secured to the rings for drawing them together. This presses at least one edge of each ring tightly against the tire carcass bead, thereby causing the envelope to be pressed tightly and continuously against the outside of the bead and forming an annular seal. In a preferred embodiment, the retaining means comprises a series of springs secured at one end to a radially inner edge of one circular ring and extending to a hook on the other ring. The outer edge of the annular portion of each ring is provided with an elastomeric sealing member so that it can apply concentrated sealing pressure against the envelope without causing any damage to it. Preferably, at least four springs spaced apart circumferentially are used, each in combination with a spreader block that keeps the tire beads apart at the proper distance. Additional springs without spreader blocks may be utilized if desired.

The principal object of the invention is therefore to provide an improved device for sealing a tire envelope and particularly one used for recapping a tire having worn or damaged beads that might otherwise be difficult to seal around the envelope. This and other objects, advantages, features and characteristics of the invention will be apparent from the following description of a preferred embodiment, considered along with the accompanying drawing.

DESCRIPTION OF THE DRAWING

FIG. 1 is a view in perspective showing a premolded tread assembly for retreading a tire utilizing an envelope sealing device according to the present invention;

FIG. 1A is a view in cross section of the premolded tire tread assembly and sealing device shown in FIG. 1;

FIG. 2 is an exploded view in perspective of the envelope sealing device shown in FIG. 1;

FIG. 3A is an enlarged view in section showing the sealing device of the invention as it engages the tire beads but before it is secured in place;

FIG. 3B is a view similar to FIG. 3A with the sealing device secured in place;

FIG. 4 is a view in elevation showing one ring member of a retreading device of FIG. 1;

FIG. 5 is a view in elevation showing another ring member which is used with the ring member of FIG. 4 to form the device of FIG. 1.

DESCRIPTION OF A PREFERRED EMBODIMENT

With reference to the drawing, FIGS. 1 and 2 show a tire retreading assembly 10, with a retreading envelope 11 of conventional configuration covering a tire casing 12 on which is positioned a premolded tread 13, to be secured to the carcass 12 by vulcanization of uncured rubber compound 14 sandwiched between them. The envelope 11 is pressed in sealing engagement against the bead portion 16 of the tire casing by the device 17 of the invention, which comprises a pair of rigid circular rings 18, preferably of metal and interconnected by a series of springs 19. The springs which are connected at opposite ends to the two rings are circumferentially spaced apart and at least some of the springs extend through a spacer block 20 that fits between the tire beads to hold them apart at a uniform distance.

As illustrated most clearly in FIGS. 3A and 3B, both of the rigid rings are of the same diameter and have generally a right angular cross section with an annular portion 21 which is integral with a cylindrical portion 22. The annular portion of each ring is wide enough to cover most of the side exterior area of the tire bead, and the cylindrical portion extends inwardly to cover substantially the entire edge of the tire bead on one side of the carcass. Thus, as shown, the outer edge of each annular ring portion contacts the tire approximately in the area where its sidewall curves into the tire bead. Attached to this outer edge of each annular ring portion is a compression ring 23 of relatively hard elastomeric material which forms an enlarged cross section of this material. Preferably, this compression ring has a square or diamond shaped cross section so that, as shown in FIG. 3B, when the springs 19 are connected to both circular rings 18 to draw each one firmly against the adjacent tire bead during a retreading procedure, the compression rings 23 of both rigid rings function to concentrate pressure against the envelope 11 on the tire to produce a reliable seal.

The spacer blocks 20, are preferably utilized at at least four circumferentially spaced apart locations on the rings 18 where spring members are attached. Each block has a generally T-shaped configuration with a main body portion 24 having a length that is equal to the normal spacing of the beads on the tire being retreaded. An integral base portion 25 projects from one side of the body portion and has a transverse bore 26 through which a spring member 19 can extend. Thus, the spring member helps to maintain the spacer block in its proper position.

The spring members 19 are tightly coiled and one end is permanently attached by an end loop 27 to a U-shaped fitting 28 fixed to the annular portion of one rigid ring member. To the other end of each spring is attached a small retainer ring 29 and a pull loop 30. When the rigid rings 18 are installed during a retreading procedure, the retainer ring 29 is adapted to fit over and be held by a hook-like post 31 that is fixed to the annular portion of the other rigid ring member.

As shown in FIGS. 4 and 5, there are an equal number of springs attached to one rigid ring member 18 as there are hook-like posts 31 on the other rigid ring member. Also, the U-shaped fittings for the springs on one rigid ring are spaced apart precisely the same amount as the hook-like posts 31 on the other rigid ring.

In a typical retreading operation utilizing the apparatus of the present invention, the tire carcass 12 to be retreaded is first prepared in the well known manner which includes buffing the tire tread surface. Next, the thin layer of uncured bonding rubber 14 is placed on the buffed and prepared tire surface and the precured and premolded tread rubber 13 is placed over the bonding layer and around the tire. Usually, the ends of the tread rubber are stapled together to retain them in position. Now, an envelope 11 of elastomeric material is placed over the tire and tread assembly so that it covers the tire tread area, its sidewalls and at least down to the inner edges of both bead areas. The envelope may even extend around each bead portion and partially inside the tire, if desired.

An additional annular gasket 32 having approximately the same thickness as the envelope is preferably utilized under the envelope on each side of the tire, as shown in FIG. 3B.

Both of the ring members 18 are preferably provided with circumferential spaced apart aligner tabs 33 that are fixed, as by welding, to the inner surface of the cylindrical portion 22 of each ring member. These aligner tabs, as shown in FIG. 2, extend beyond the edge of the ring member and onto the other ring member when the device 17 is installed for a retreading operation.

With the envelope and the gaskets 32 in place, the rigid rings 18 can be quickly positioned on opposite sides of the tire and tread assembly, as shown in FIGS. 3A and 3B. With both rings in place, as shown in FIG. 3A, the end loop of each spring can be grasped manually and pulled into position with its retainer ring on the post 31, as shown in FIG. 3B. As this is done, the spacer block 20 on the spring 19 is positioned between the tire beads. Once all of the springs have been connected between the two rigid rings, the edge compression rings 23 on both sides of the tire apply concentrated pressure against the envelope in the annular recessed area adjacent each tire bead portion. The result is a reliable seal for the envelope on the tire that lasts throughout the entire retreading process. After the springs are in place to seal the envelope, the entire assembly is placed in a module or autoclave where heat and pressure can be applied to vulcanize the thin layer of bonding rubber and thereby adhere the cured retread rubber to the tire carcass. After the heating step, the rigid rings 18 can be quickly removed along with the envelope.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A device for use in vulcanizing a premolded, precured tire tread to a tire casing in a tire retreading operation which includes sealing a retreading envelope against the tire carcass in the bead area of the tire, said device, comprising:

a pair of rigid circular ring members each sized to fit against the exterior bead portion of the tire casing, with the envelope interposed between the ring and the tire casing, each said rigid circular ring member having a right angular cross section including an annular portion adapted to fit against the outer side area of a tire bead portion and a cylindrical portion adapted to fit against the inner edge surface of the tire bead and enlarged means on an outer edge of said annular portion of each of said ring members for providing a concentrated pressure on the envelope at the tire bead area to assure a fluid tight circumferential seal of the envelope around both bead portions of the tire casing;

a series of interconnecting springs attached to one said ring member and retained by means on the other said ring member at circumferentially spaced apart locations for holding said ring means tightly against the bead portions of the tire casing; and spacer means attached to at least some of said springs for maintaining a uniform distance between the bead portions of the tire casing.

2. The device as described in claim 1 wherein each said spacer means has a body portion with a length equal to the desired distance between tire bead portions during the retreading process, and a base portion extending from said body portion having a bore through which a said spring can extend.

3. The device as described in claim 1 including a pair of annular gasket members of sheet elastomeric material, each having an inside and outside diameter sufficient to enable each gasket to cover the outside surface of the tire bead portion on one side of the tire under a said ring member.

4. The device as described in claim 1 wherein said means on each ring member for providing concentrated pressure on the envelope comprises a compression ring of elastomeric material attached to the outer edge of said annular portion of each said ring member.

* * * * *